(12) United States Patent
Chang et al.

(10) Patent No.: US 11,137,590 B2
(45) Date of Patent: Oct. 5, 2021

(54) TUNABLE OPTICAL DEVICE

(71) Applicant: Industrial Technology Research Institute, Hsinchu (TW)

(72) Inventors: Chia-Jung Chang, Hsinchu County (TW); Jing-Yuan Lin, New Taipei (TW); Chun-Kai Mao, Tainan (TW); Jien-Ming Chen, Tainan (TW); Yu-Sheng Hsieh, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 574 days.

(21) Appl. No.: 15/067,195

(22) Filed: Mar. 11, 2016

(65) Prior Publication Data
US 2017/0139200 A1    May 18, 2017

Related U.S. Application Data

(60) Provisional application No. 62/268,457, filed on Dec. 16, 2015.

(30) Foreign Application Priority Data

Nov. 18, 2015 (TW) .................................. 104138060

(51) Int. Cl.
    G02B 26/00    (2006.01)
(52) U.S. Cl.
    CPC .................................. *G02B 26/00* (2013.01)
(58) Field of Classification Search
    None
    See application file for complete search history.

(56) References Cited

U.S. PATENT DOCUMENTS 6,424,466 B1    7/2002  Flanders
6,791,649 B1    9/2004  Nakamura et al.
(Continued)

FOREIGN PATENT DOCUMENTS

CN    1620626       5/2005
CN    101855586    10/2010
(Continued)

OTHER PUBLICATIONS

Timothy J. Russin, et al., "Fabrication and Analysis of a MEMS NIR Fabry-Péerot Interferometer," Journal of Microelectromechanical Systems, vol. 21, No. 1, Feb. 2012, pp. 181-189.
(Continued)

*Primary Examiner* — Christopher Stanford
*Assistant Examiner* — Journey F Sumlar
(74) *Attorney, Agent, or Firm* — JCIPRNET (57) ABSTRACT

A tunable optical device including a substrate, at least one support unit, a flexible frame, an elastic component, a first reflector, and at least one actuator is provided. The support unit is fixed onto the substrate. The flexible frame is connected to the support unit and suspended above the substrate. The elastic component is connected to the flexible frame. A stiffness of the elastic component in the Z-axis is smaller than a stiffness of the flexible frame in the Z-axis. The Z-axis direction is parallel to a normal direction of the substrate. The first reflector is connected to the elastic component. The actuator is located between the flexible frame and the substrate or located between the first reflector and the substrate.

17 Claims, 7 Drawing Sheets

(56) References Cited

U.S. PATENT DOCUMENTS

| | | | |
|---|---|---|---|
| 7,420,738 B2 | 9/2008 | Verghese | |
| 8,654,347 B2 | 2/2014 | Antila et al. | |
| 2005/0007933 A1* | 1/2005 | Yoda | G02B 6/29395 |
| | | | 369/112.22 |
| 2007/0242358 A1* | 10/2007 | Lin | G01J 3/26 |
| | | | 359/578 |
| 2007/0242920 A1 | 10/2007 | Lin et al. | |
| 2008/0239494 A1* | 10/2008 | Zander | G02B 26/001 |
| | | | 359/578 |
| 2009/0153844 A1 | 6/2009 | Peter et al. | |
| 2011/0279824 A1 | 11/2011 | Blomberg et al. | |
| 2012/0168271 A1* | 7/2012 | Ryaboy | G01M 5/0066 |
| | | | 188/379 |
| 2012/0181647 A1 | 7/2012 | Blomberg | |
| 2013/0301098 A1 | 11/2013 | Mathur et al. | |
| 2014/0198388 A1* | 7/2014 | Reed | G02B 26/001 |
| | | | 359/578 |
| 2015/0124263 A1 | 5/2015 | Antila et al. | |
| 2015/0212313 A1 | 7/2015 | Nozomu | |

FOREIGN PATENT DOCUMENTS

| | | | |
|---|---|---|---|
| CN | 102466516 | 5/2012 | |
| CN | 102576149 | 7/2012 | |
| CN | 103733035 | 4/2014 | |
| CN | 104007546 | 8/2014 | |
| CN | 104169778 | 11/2014 | |
| CN | 104380173 | 2/2015 | |
| CN | 104428642 | 3/2015 | |
| NO | 2770937 A1 * | 3/2011 | G02B 26/001 |
| TW | 550235 | 9/2003 | |
| TW | 555687 | 10/2003 | |
| TW | I238269 | 8/2005 | |
| TW | 200909853 | 3/2009 | |
| TW | 201533471 | 9/2015 | |

OTHER PUBLICATIONS

Norbert Neumann, et al., "Novel MWIR microspectrometer based on a tunable detector," Proceedings of SPIE—The International Society for Optical Engineering (Impact Factor: 0.2), vol. 7208, Feb. 2009, pp. 7208D-1-7208D-8.

Avinash Parashar, et al., "Three Cavity Tunable MEMS Fabry Perot Interferometer," Sensors (Basel), vol. 7, No. 12, Dec. 2007, pp. 3071-3083.

M Tuohiniemi, et al., "Surface-micromachined silicon air-gap Bragg reflector for thermal infrared," Journal of Micromechanics and Microengineering, vol. 21, Jun. 9, 2011, pp. 075014-1-075014-7.

Jonathan Masson, et al., "MEMS Tunable Silicon Fabry-Perot Cavity," Proceedings of SPIE—Optomechatronic Micro/Nano Devices and Components III, vol. 6717, Sep. 10, 2007, pp. 671705-1-pp. 671705-7.

"Office Action of Taiwan Counterpart Application", dated Nov. 9, 2016, p. 1-p. 6, in which the listed references were cited.

"Office Action of China Counterpart Application," dated Dec. 5, 2018, p. 1-p. 12.

* cited by examiner

TUNABLE OPTICAL DEVICE

CROSS-REFERENCE TO RELATED APPLICATION

This application claims the priority benefit of Taiwan application no. 104138060, filed on Nov. 18, 2015, and U.S. Provisional Application No. 62/268,457, filed on Dec. 16, 2015. The entirety of the above-mentioned patent applications is hereby incorporated by reference herein and made a part of this specification.

BACKGROUND OF THE DISCLOSURE

Technical Field

The disclosure relates to an optical device and particularly relates to a tunable optical device.

Description of Related Art

A Fabry-Perot optical filter is a filter manufactured based on the principle of multiple-beam interference and it is usually provided with a first reflector and a second reflector that are arranged in parallel to define a Fabry-Perot resonator. After light passes through the first reflector and enters the Fabry-Perot resonator, the light will oscillate back and forth between the first reflector and the second reflector. Since a specific distance is maintained between the first reflector and the second reflector, the light having a specific wavelength Rains a constructive interference, and the light that foil is the constructive interference (i.e., the light having the specific wavelength) passes through the second reflector and is emitted out of the Fabry-Perot resonator. Generally, the light having a specific band can be filtered by adjusting the angle the light enters the Fabry-Perot resonator or adjusting the distance between the first reflector and the second reflector.

According to the current technology, most methods adjust the distance between the first reflector and the second reflector by moving the first reflector close to the second reflector that is stationary to reduce the cavity length of the Fabry-Perot resonator (i.e., the distance between the first reflector and the second reflector). Thus, the obtained light has a shorter band and a narrower band range. In order that the Fabry-Perot optical filter can achieve wide-band filtering, the initial position of the first reflector may be set relatively far away from the second reflector. However, such Fabry-Perot optical filter is usually large in size and not easy to be made compact. Thus, how to miniaturize the Fabry-Perot optical filter and at the same time achieve wide-band filtering is an issue that needs to be addressed.

SUMMARY OF THE DISCLOSURE

An exemplary embodiment of the disclosure provides a tunable optical device including a substrate, at least one support unit, a flexible frame, an elastic component, a first reflector, and at least one actuator. The support unit is fixed onto the substrate. The flexible frame is connected to the support unit and suspended above the substrate. The elastic component is connected to the flexible frame. A stiffness of the elastic component in a Z-axis direction is smaller than a stiffness of the flexible frame in the Z-axis direction. The Z-axis direction is parallel to a normal direction of the substrate. The first reflector is connected to the elastic component. The actuator is located between the flexible frame and the substrate or located between the first reflector and the substrate.

An exemplary embodiment of the disclosure provides a tunable optical device including a substrate, at least one support unit, a flexible frame, an elastic component, a first reflector, a second reflector, a first actuator, a second actuator, a first external electrode pad, a second external electrode pad, and a third external electrode pad. The support unit includes at least one holder and at least two suspended structures. The holder is fixed onto the substrate. The suspended structures are symmetrically disposed with respect to the horizontal direction and respectively located at two opposite sides of the flexible frame. The flexible frame is connected to the holder through the suspended structures and suspended above the substrate. The flexible frame includes a body and two wing structures. The two wing structures are respectively connected to two opposite sides of the body. The two wing structures are parallel to the substrate and coplanar. The elastic component is connected to the body of the flexible frame, wherein the stiffness of the elastic component in a Z-axis direction is smaller than the stiffness of the flexible frame in the Z-axis direction. The Z-axis direction is parallel to a normal direction of the substrate. The first reflector is connected to the elastic component, wherein the body surrounds the first reflector and the elastic component is located between the body and the first reflector. The second reflector is disposed on the substrate opposite to the first reflector. The first actuator is located between the first reflector and the substrate, wherein the first actuator includes an oppositely disposed first electrode pair and an oppositely disposed second electrode pair. A first upper electrode of the first electrode pair and a second upper electrode of the second electrode pair are respectively connected to the first reflector, and a first lower electrode of the first electrode pair and a second lower electrode of the second electrode pair are respectively disposed on the substrate. The second actuator and the first actuator are respectively located at two opposite sides of any one of the suspended structures, wherein the second actuator is located between each wing structure of the flexible frame and the substrate. The second actuator includes an oppositely disposed third electrode pair and an oppositely disposed fourth electrode pair. A third upper electrode of the third electrode pair and a fourth upper electrode of the fourth electrode pair are respectively disposed on the two wing structures, and a third lower electrode of the third electrode pair and a fourth lower electrode of the fourth electrode pair are respectively disposed on the substrate. The first external electrode pad is disposed on the substrate, wherein the first upper electrode and the second upper electrode are electrically connected to the first external electrode pad respectively through the first reflector, the elastic component, the flexible frame, the suspended structures, and the holder; and the third upper electrode and the fourth upper electrode are electrically connected to the same first external electrode pad respectively through the flexible frame, the suspended structures, and the holder. The second external electrode pad is disposed on the substrate, wherein the first lower electrode and the second lower electrode are electrically connected to the second external electrode pad respectively. The third external electrode pad is disposed on the substrate, wherein the third lower electrode and the fourth lower electrode are electrically connected to the third external electrode pad respectively.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated

DESCRIPTION OF THE EMBODIMENTS

Figure 1:
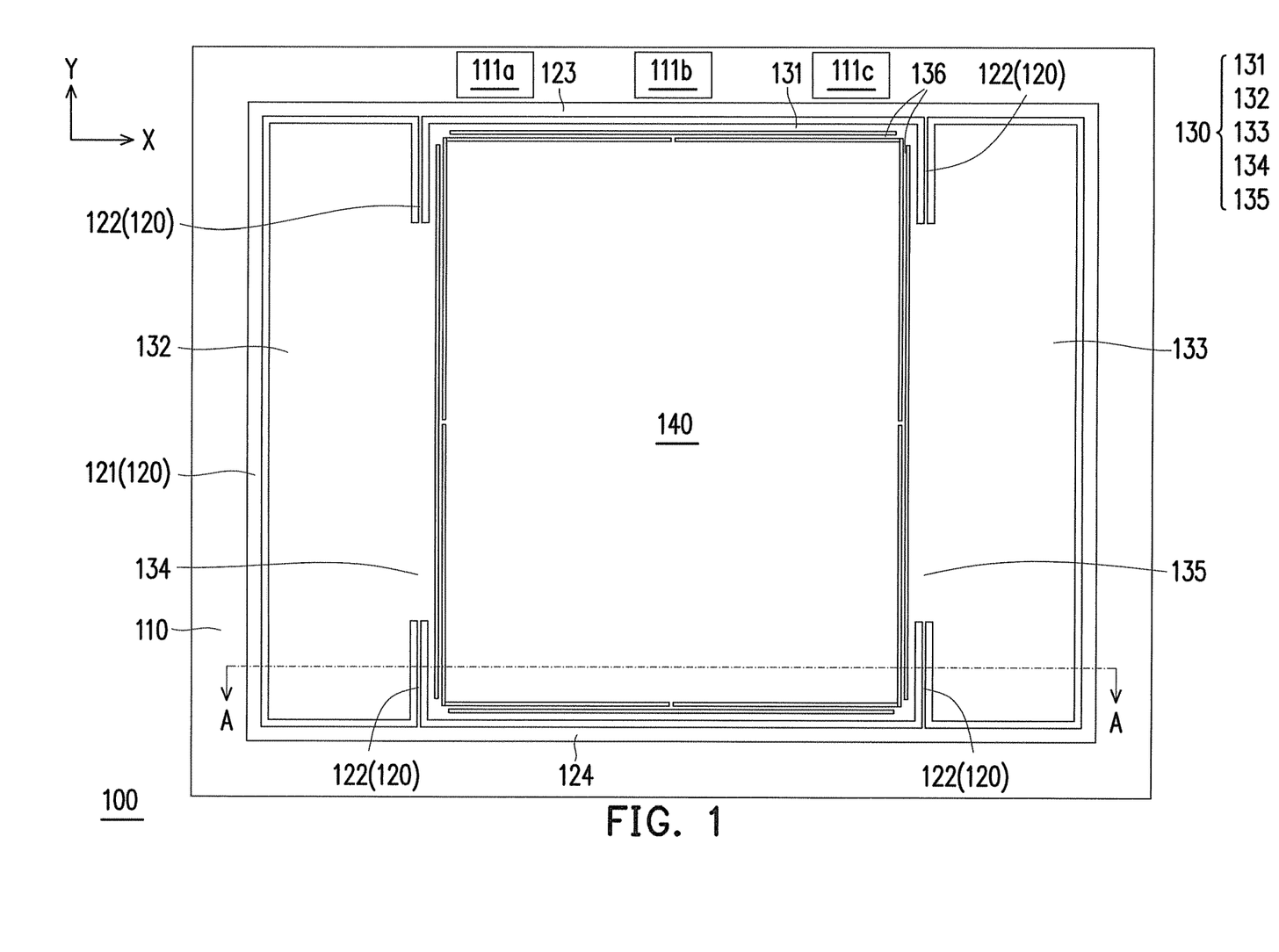
FIG. 1 is a schematic top view of a tunable optical device according to an embodiment of the disclosure.
Figure 2:
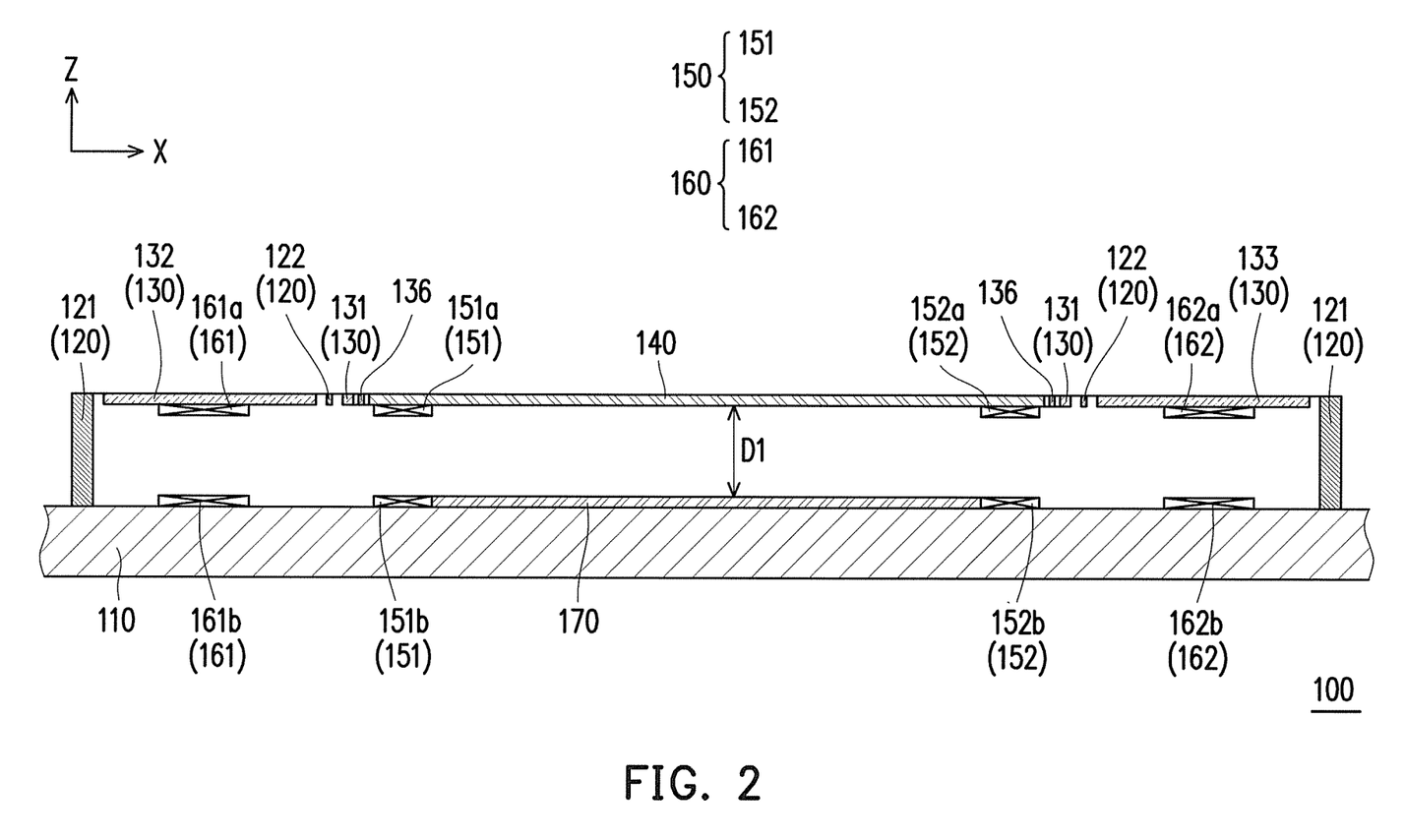
FIG. 2 is a schematic cross-sectional view of the tunable optical device of FIG. 1 taken along the section line A-A.

FIG. 1 is a schematic top view of a tunable optical device according to an embodiment of the disclosure. FIG. 2 is a schematic cross-sectional view of the tunable optical device of FIG. 1 taken along the section line A-A. In order to clearly illustrate the disclosure and facilitate the description, FIG. 2 is slightly enlarged. Referring to FIG. 1 and FIG. 2, in this embodiment, a tunable optical device 100 includes a substrate 110, at least one support unit 120, a flexible frame 130, an elastic component 136, a first reflector 140, a first actuator 150, and a second actuator 160. The support unit 120 is fixed onto the substrate 110. The flexible frame 130 is connected to the support unit 120 and suspended above the substrate 110. The elastic component 136 is connected to the flexible frame 130. The first reflector 140 is connected to the elastic component 136. The first actuator 150 is located between the first reflector 140 and the substrate 110, and the second actuator 160 is located between the flexible frame 130 and the substrate 110. Although the first actuator 150 and the second actuator 160 are both provided in this embodiment, the disclosure is not limited thereto. In other embodiments, it is possible to dispose only the first actuator between the first reflector and the substrate or the second actuator between the flexible frame and the substrate. In addition, the number of the actuators may be changed according to the design requirements.

The substrate 110 is a transparent substrate that allows light of a specific wavelength to pass, for example, and a material thereof includes glass, acrylic, quartz, sapphire, or other suitable transparent materials. The support unit 120 may include at least one holder 121 and at least two suspended structures 122 (four are shown in FIG. 1 as an example), wherein a material of the holder 121 and the suspended structures 122 may include metal, metal alloy, semiconductor, semiconductor oxide, a combination of the foregoing, or other suitable conductive materials. The holder 121 is for example a frame structure fixed on the substrate 110 and surrounds the flexible frame 130, the elastic component 136, the first reflector 140, the first actuator 150, and the second actuator 160. The suspended structures 122 are symmetrically disposed with respect to a horizontal direction (e.g., X-axis direction or Y-axis direction) and respectively located at two opposite sides of the flexible frame 130, and the flexible frame 130 is connected to the holder 121 through the suspended structures 122 to be suspended above the substrate 110. Because the first reflector 140 is connected to the flexible frame 130 through the elastic component 136 and the flexible frame 130 is connected to the holder 121 through the suspended structures 122, the holder 121 maintains an initial distance between the first reflector 140 and the substrate 110.

Moreover, the first reflector 140 may be composed of a conductive material, such as metal, metal alloy, semiconductor, and semiconductor oxide, or be provided with a conductive wire layer (not shown). The flexible frame 130 and the elastic component 136 may be composed of a conductive material with good flexibility, such as semiconductor (e.g., Si), metal (e.g., Al), and metal alloy (e.g., Al/Cu alloy), or a non-conductive material with good flexibility (e.g., dielectric material) that is mixed with conductive particles or provided with a conductive wire layer (not shown). Thus, the first reflector 140 may be electrically connected to a first external electrode pad 111a on the substrate 110 through the elastic component 136, the flexible frame 130, and the support unit 120, wherein the first external electrode pad 111a is located outside the flexible frame 130 and not surrounded by the flexible frame 130. For example, a conductive wire layer (not shown) may be disposed on the substrate 110 for electrically connecting the support unit 120 and the first external electrode pad 111a.

In this embodiment, the holder 121 has a first side wall 123 and a second side wall 124 which is opposite to the first side wall 123. The flexible frame 130 is connected to the first side wall 123 of the holder 121 through two symmetrically disposed suspended structures 122 and connected to the second side wall 124 of the holder 121 through the other two symmetrically disposed suspended structures 122, such that the flexible frame 130 suspended above the substrate 110 remains parallel to the substrate 110. Specifically, the flexible frame 130 has a body 131, a first wing structure 132, and a second wing structure 133, wherein the first wing structure 132 and the second wing structure 133 are parallel to the substrate 110 and coplanar. A gap is respectively maintained between the first wing structure 132 and the second wing structure 133 and the body 131, wherein the first wing structure 132 is connected to the body 131 through a first connection part 134 and the second wing structure 133 is connected to the body 131 through a second connection part 135, for example. As shown in FIG. 1, the two symmetrically disposed suspended structures 122 extend from the holder 121 to the gap between the first wing structure 132 and the body 131, so as to connect the first connection part 134. The other two symmetrically-disposed suspended structures 122 extend from the holder 121 to the gap between the second wing structure 133 and the body 131, so as to connect the second connection part 135. In other words, the first wing structure 132 and the second wing structure 133 are respectively connected to two opposite sides of the body 131.

As shown in FIG. 1, the body 131 is a frame structure, for example, and the first reflector 140 is disposed in this frame structure and connected to the body 131 through the elastic component 136. In other words, the body 131 surrounds the first reflector 140, wherein the elastic component 136 is located between the body 131 and the first reflector 140 and surrounds the first reflector 140. It should be noted that the disclosure is not intended to limit the configuration of the elastic component 136 surrounding the first reflector 140. In other embodiments, the elastic component may be located at two opposite sides of the first reflector. Furthermore, a stiffness of the elastic component 136 in a Z-axis direction is smaller than a stiffness of the flexible frame 130 in the Z-axis direction, wherein the Z-axis direction is parallel to a normal direction or a gravity direction of the substrate 110. Thereby, when the flexible frame 130 or the first reflector 140 is actuated, the first reflector 140 connected to the flexible frame 130 through the elastic component 136 remains parallel to the substrate 110. Details will be described hereinafter.

Referring to FIG. 1 and FIG. 2, in this embodiment, the first actuator 150 and the second actuator 160 are respectively located at two opposite sides of any one of the suspended structures 122. The first actuator 150 may include an oppositely disposed (or called symmetrically arranged) first electrode pair 151 and an oppositely disposed (or called symmetrically arranged) second electrode pair 152. For example, the first electrode pair 151 is relatively close to the first wing structure 132 and the second electrode pair 152 is relatively close to the second wing structure 133. Specifically, a first upper electrode 151a of the first electrode pair 151 is connected to the first reflector 140 and a first lower electrode 151b of the first electrode pair 151 is disposed on the substrate 110. Likewise, a second upper electrode 152a of the second electrode pair 152 is connected to the first reflector 140 and a second lower electrode 152b of the second electrode pair 152 is disposed on the substrate 110. Although the first upper electrode 151a and the second upper electrode 152a are symmetrically disposed on the substrate 110 in this embodiment, the disclosure is not limited thereto. In other embodiments, the first reflector may have two receiving spaces for receiving the first upper electrode and the second upper electrode, wherein the first upper electrode and the second upper electrode located in the two receiving spaces may be directly or indirectly connected to the first reflector.

In addition, the second actuator 160 may include an oppositely disposed (or called symmetrically arranged) third electrode pair 161 and a fourth electrode pair 162. The third electrode pair 161 and the fourth electrode pair 162 are symmetrically disposed with respect to the horizontal direction, such as X-axis direction or Y-axis direction. A third upper electrode 161a of the third electrode pair 161 is disposed on the first wing structure 132 and a third lower electrode 161b of the third electrode pair 161 is disposed on the substrate 110. A fourth upper electrode 162a of the fourth electrode pair 162 is disposed on the second wing structure 133 and a fourth lower electrode 162b of the fourth electrode pair 162 is disposed on the substrate 110. In other words, the third electrode pair 161 and the fourth electrode pair 162 are respectively located at two opposite sides of the first reflector 140. Specifically, the first electrode pair 151 and the third electrode pair 161 are respectively located at two opposite sides of the two symmetrically disposed suspended structures 122, and the third electrode pair 161 and the fourth electrode pair 162 are respectively located at two opposite sides of the other two symmetrically disposed suspended structures 122.

Because the first reflector 140 can be electrically connected to the first external electrode pad 111a located on the substrate 110 through the elastic component 136, the flexible frame 130, the suspended structures 122, and the holder 121, the first upper electrode 151a and the second upper electrode 152a connected to the first reflector 140 are electrically connected to the first external electrode pad 111a respectively. Moreover, the third upper electrode 161a and the fourth upper electrode 162a located on the flexible frame 130 may be electrically connected to the first external electrode pad 111a located on the substrate 110 through the flexible frame 130, the suspended structures 122, and the holder 121. In other words, the first upper electrode 151a, the second upper electrode 152a, the third upper electrode 161a, and the fourth upper electrode 162a are all electrically connected to the same first external electrode pad 111a, and the first external electrode pad 111a is a ground electrode, for example. Furthermore, the first lower electrode 151b and the second lower electrode 152b located on the substrate 110 may be electrically connected to a second external electrode pad 111b through the conductive wire layer (not shown) on the substrate 110 respectively, and the third lower electrode 161b and the fourth lower electrode 162b located on the substrate 110 may be electrically connected to a third external electrode pad 111c through the conductive wire layer (not shown) on the substrate 110 respectively. As shown in FIG. 1, the second external electrode pad 111b and the third external electrode pad 111c are both located outside the flexible frame 130 and not surrounded by the flexible frame 130.

In this embodiment, the tunable optical device 100 further includes a second reflector 170. The first reflector 140 and the second reflector 170 may include a Distributed Bragg reflector, wherein the second reflector 170 is disposed on the substrate 110 corresponding to the first reflector 140. The first reflector 140 and the second reflector 170 can be composed of Si, Ge, SiO2, CaF2, MgF2, Al2O3, air and so forth. Preferably, the material of the first reflector 140 and the second reflector 170 at least comprise composition of Si or Ge, such as Si/SiO2/Si/SiO2/Si, Si/CaF2/Si/CaF2/Si, Si/MgF2/Si/MgF2/Si, Ge/MgF2/Ge/MgF2/Ge and so forth. As shown in FIG. 2, the second reflector 170 is located right below the first reflector 140 (that is, an orthographic projection of the first reflector 140 on the substrate 110 overlaps the second reflector 170), and the electrodes of the first electrode pair 151 and the second electrode pair 152 located on the substrate 110 are respectively located at two opposite sides of the second reflector 170, for example. In other embodiments, one of the electrodes of the first electrode pair and the second electrode pair may be disposed on the second reflector.

Because the first reflector 140 remains parallel to the second reflector 170 on the substrate 110 and a first distance D1 (obtained by subtracting the thickness of the second reflector 170 from the initial distance between the first reflector 140 and the substrate 110) exists between the first reflector 140 and the second reflector 170, the first reflector 140 and the second reflector 170 define a Fabry-Perot resonator. After light passes through the first reflector 140 and enters the Fabry-Perot resonator, the light will oscillate back and forth between the first reflector 140 and the second reflector 170. Because of the first distance D1 existing between the first reflector 140 and the second reflector 170, light having a first specific wavelength forms a constructive interference, and the light that forms the constructive interference (i.e., the light having the first specific wavelength) passes through the second reflector 170 and is emitted out of the Fabry-Perot resonator.

Figure 3:
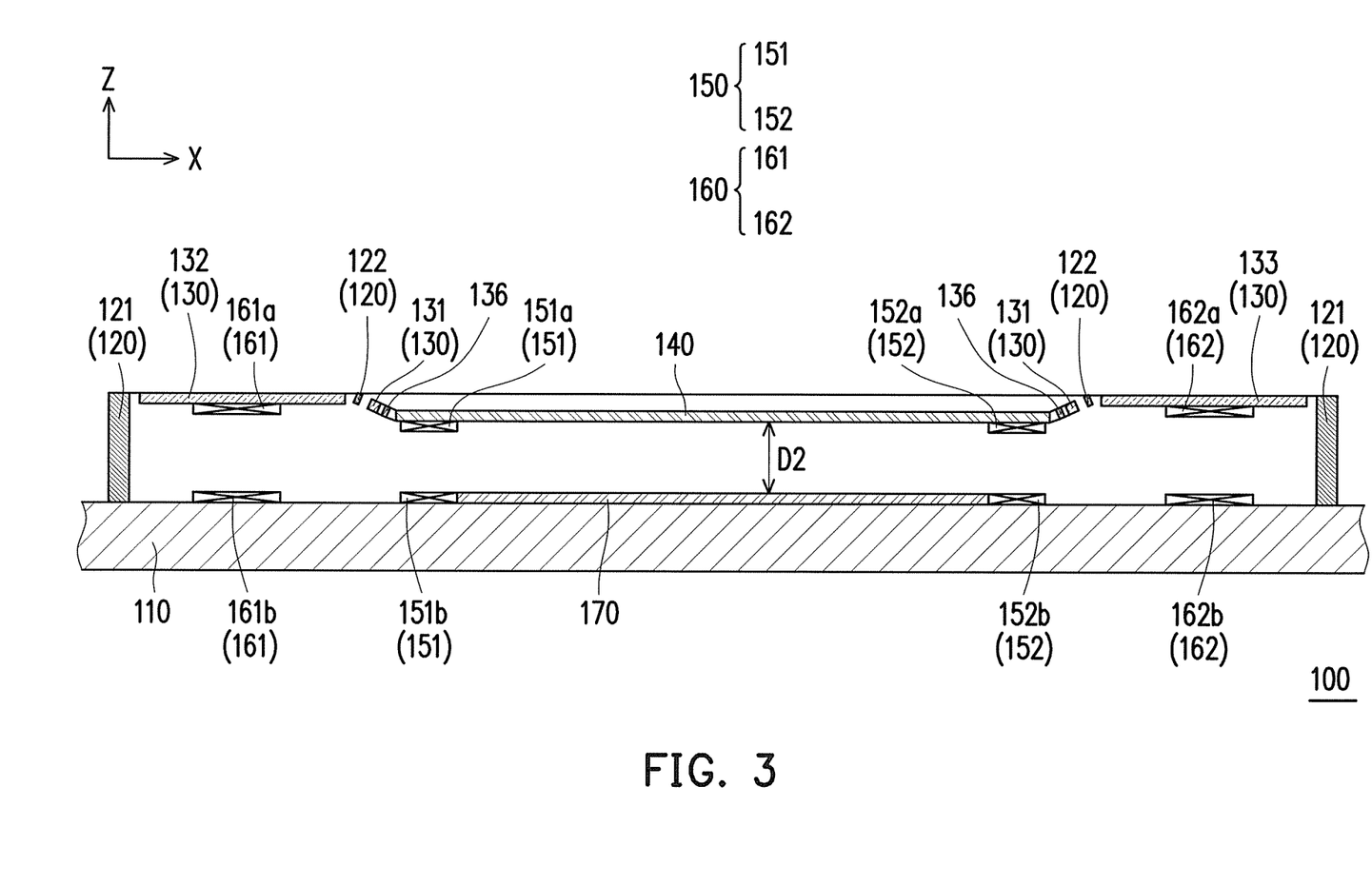
FIG. 3 and FIG. 4 are schematic cross-sectional views showing the tunable optical device of FIG. 2 in operation.
Figure 4:
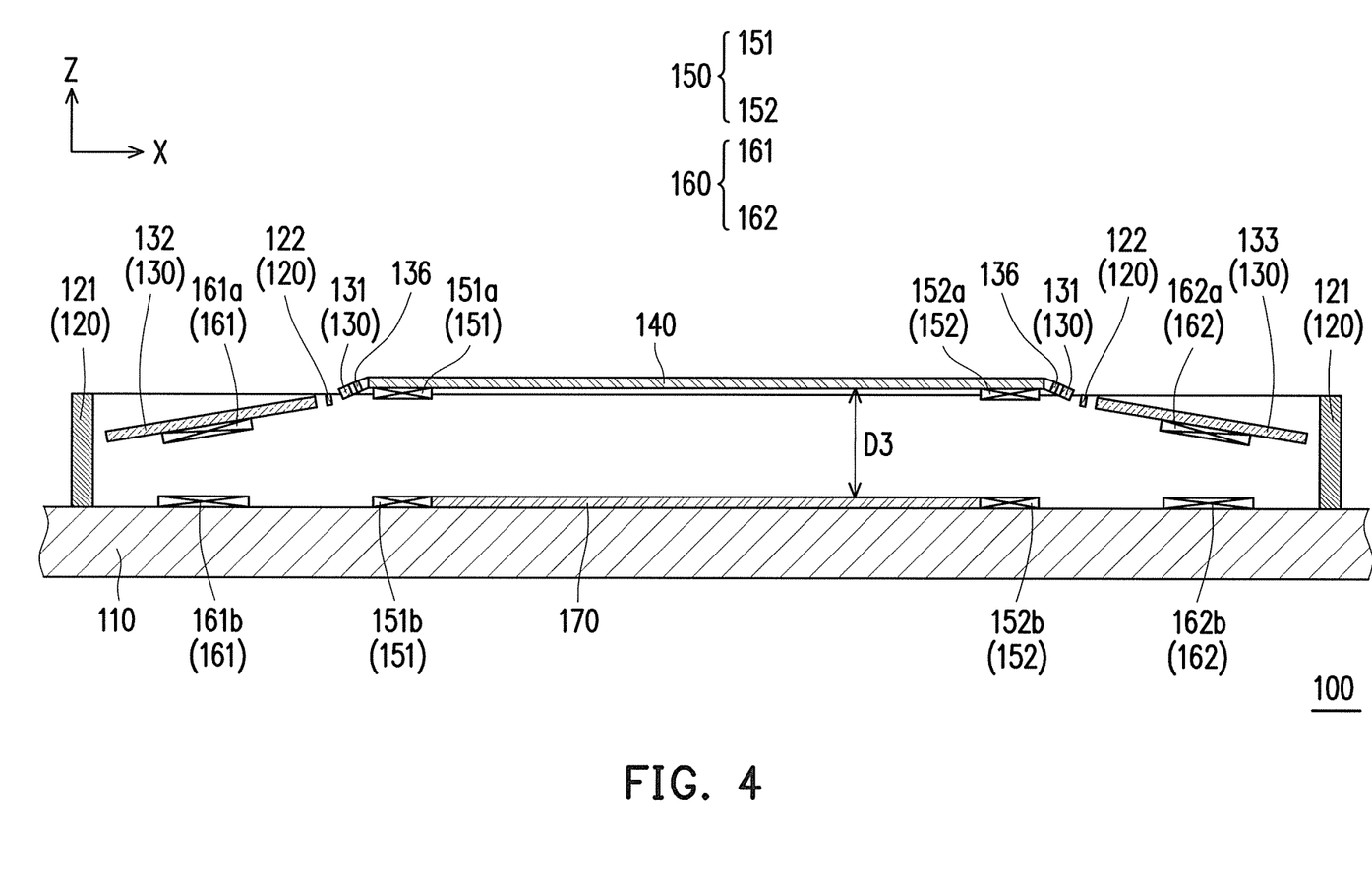
Figure 5:
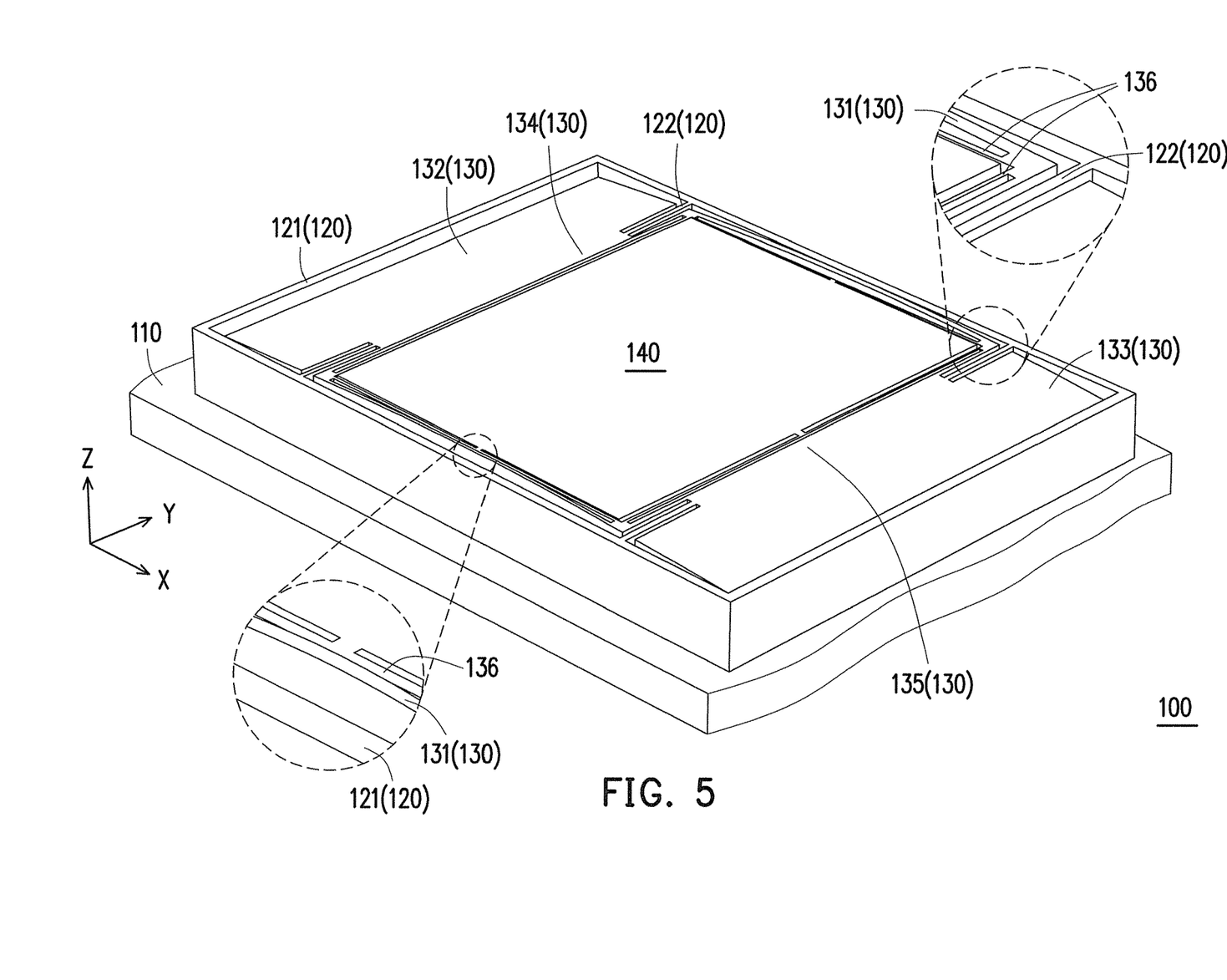
FIG. 5 is a schematic perspective view of the tunable optical device corresponding to FIG. 4.

FIG. 3 and FIG. 4 are schematic cross-sectional views showing the tunable optical device of FIG. 2 in operation. FIG. 5 is a schematic perspective view of the tunable optical device corresponding to FIG. 4. Referring to FIG. 1 to FIG. 3, when a bias voltage is applied to the first electrode pair 151 and the second electrode pair 152 through the first external electrode pad 111a and the second external electrode pad 111b, the first upper electrode 151a and the second upper electrode 152a located on the first reflector 140 are driven to respectively move toward the first lower electrode 151b and the second lower electrode 152b on the substrate 110, such that the body 131 of the flexible frame 130 and the elastic component 136 connected to the body 131 of the flexible frame 130 are elastically deformed to reduce the distance between the first reflector 140 and the substrate 110. In other words, with the suspended structures 122 as the fulcrum, the first reflector 140 moves close to the substrate 110 to have a second distance D2 with respect to the second reflector 170 while the first wing structure 132 and the second wing structure 133 do not deform with the body 131 and remain parallel to the substrate 110. Because the stiffness of the elastic component 136 is for example smaller than or equal to the stiffness of the body 131 of the flexible frame 130, the stress caused by the elastic deformation of the body 131 of the flexible frame 130 is released to keep the first reflector 140 connected to the body 131 through the elastic component 136 parallel to the second reflector 170.

In other words, when the bias voltage is applied to the first electrode pair 151 and the second electrode pair 152, only the first reflector 140 moves close to the substrate 110 to form the second distance D2, which is smaller than the first distance D1, with respect to the second reflector 170. After light passes through the first reflector 140 and enters the Fabry-Perot resonator, the light will oscillate back and forth between the first reflector 140 and the second reflector 170. Because of the second distance D2 existing between the first reflector 140 and the second reflector 170, light having a second specific wavelength forms a constructive interference, and the light that forms the constructive interference (i.e., the light having the second specific wavelength) passes through the second reflector 170 and is emitted out of the Fabry-Perot resonator. Because the second distance D2 is smaller than the first distance D1, the second specific wavelength is smaller than the first specific wavelength.

Referring to FIG. 1, FIG. 4, and FIG. 5, when a bias voltage is applied to the third electrode pair 161 and the fourth electrode pair 162 through the first external electrode pad 111a and the third external electrode pad 111c, the third upper electrode 161a located on the first wing structure 132 is driven to move toward the third lower electrode 161b located on the substrate 110 and the fourth upper electrode 162a located on the second wing structure 133 is driven to move toward the fourth lower electrode 162b located on the substrate 110, such that the body 131 of the flexible frame 130 is converted into a bending deformation. With the suspended structures 122 as the fulcrum, the body 131 of the flexible frame 130 moves the first reflector 140 away from the substrate 110 while the first wing structure 132 and the second wing structure 133 of the flexible frame 130 respectively move close to the substrate 110.

Because the stiffness of the elastic component 136 in the Z-axis direction for example is smaller than the stiffness of the elastic component 136 in the X-axis or Y-axis direction, the elastic deformation of the elastic component 136 releases a bending stress that is generated by the bending deformation of the body 131 of the flexible frame 130, such that the first reflector 140 connected to the body 131 through the elastic component 136 remains parallel to the second reflector 170 and is not tilted or deformed. At the moment, a distance D3 which is greater than the first distance D1 may exist between the first reflector 140 and the second reflector 170. After light passes through the first reflector 140 and enters the Fabry-Perot resonator, the light will oscillate back and forth between the first reflector 140 and the second reflector 170. Because of the third distance D3 existing between the first reflector 140 and the second reflector 170, light having a third specific wavelength forms a constructive interference, and the light that forms the constructive interference (i.e., the light having the third specific wavelength) passes through the second reflector 170 and is emitted out of the Fabry-Perot resonator. Because the third distance D3 is greater than the first distance D1, the third specific wavelength is greater than the first specific wavelength.

In brief, at least one part of the flexible frame 130 may be elastically deformed by applying the bias voltage to the first electrode pair 151 and the second electrode pair 152 or to the third electrode pair 161 and the fourth electrode pair 162, so as to adjust the distance between the first reflector 140 and the second reflector 170. Because a tunable range of the distance (between the second distance D2 and the third distance D3, for example) may be increased, the tunable optical device 100 of this embodiment meets the design requirements of miniaturization as well as achieves wideband filtering (between the second specific wavelength and the third specific wavelength, for example). In other words, a spectral scanning range of the tunable optical device 100 of this embodiment is wider. In addition, the first reflector 140 remains parallel to the second reflector 170 as the first reflector 140 moves close to or away from the second reflector 170. Therefore, the tunable optical device 100 of this embodiment achieves a favorable spectral resolution.

It should be noted that the actuators that the disclosure uses to elastically deform at least one part of the flexible frame and/or the elastic component are not limited to the oppositely disposed electrode pairs. In other embodiments, thermal actuators, piezoelectric actuators, or electrostatic actuators may also be used for elastically deforming at least one part of the flexible frame and/or the elastic component. For example, the piezoelectric actuators may be disposed on the first reflector or on the first wing structure and second wing structure of the flexible frame, so as to elastically deform at least one part of the flexible frame and/or the elastic component in the Z-axis direction to achieve the same actuation.

Some other embodiments of the disclosure are provided as follows. It should be noted that the reference numerals and a part of the contents in the previous embodiment are used in the following embodiments, in which identical reference numerals indicate identical or similar components, and repeated description of the same technical contents is omitted. Please refer to the description of the previous embodiment for the omitted contents, which will not be repeated hereinafter.

Figure 6:
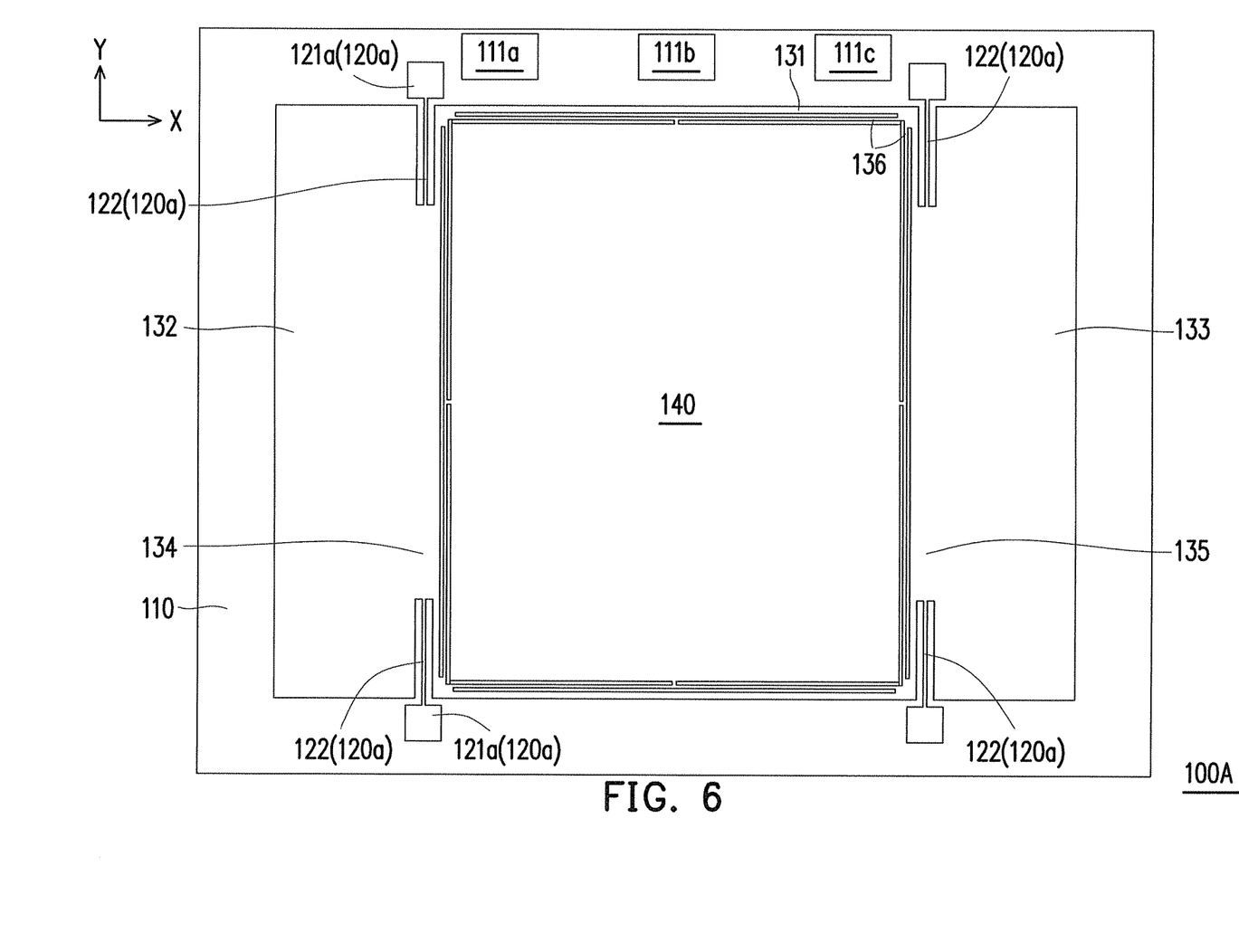
FIG. 6 is a schematic top view of a tunable optical device according to another embodiment of the disclosure.

FIG. 6 is a schematic top view of a tunable optical device according to another embodiment of the disclosure. Referring to FIG. 6, a tunable optical device 100A of this embodiment is similar to the tunable optical device 100 of the previous embodiment, and a difference therebetween lies in that: holders 121a of the support units 120a of the tunable optical device 100A are four island structures disposed corresponding to the suspended structures 122, for example. In other words, each of the suspended structures 122 is connected to the corresponding island structure.

Figure 7:
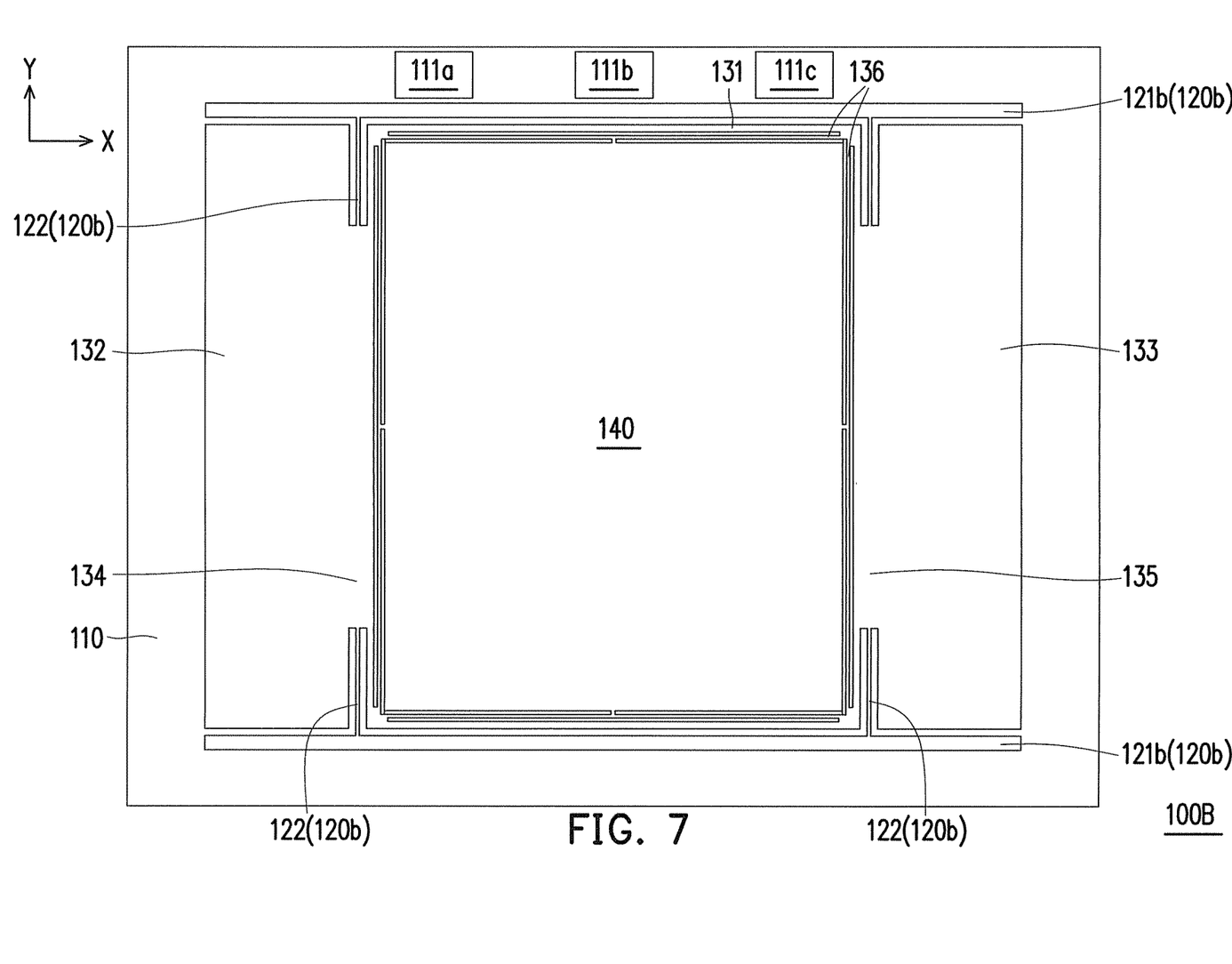
FIG. 7 is a schematic top view of a tunable optical device according to yet another embodiment of the disclosure.

FIG. 7 is a schematic top view of a tunable optical device according to yet another embodiment of the disclosure. Referring to FIG. 7, a tunable optical device 100B of this embodiment is similar to the tunable optical device 100 of the previous embodiment, and a difference therebetween lies in that: holders 121b of the support units 120b of the tunable optical device 100B are two stripe structures disposed at two opposite sides of the flexible frame 130, for example. In other words, two of the suspended structures 122 located at the same side of the flexible frame 130 are connected to the corresponding stripe structure. In other embodiments, the holders of the support units may include a combination of the island structure and stripe structure, or other suitable structures.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tunable optical device, comprising:
   a substrate;
   at least one support unit fixed onto the substrate, wherein the support unit comprises at least one holder and at least two suspended structures, and the holder is fixed onto the substrate;
   a flexible frame, wherein the suspended structures are symmetrically disposed with respect to a horizontal direction and respectively located at two opposite sides of the flexible frame, the suspended structures are parallel to the substrate, wherein the flexible frame is secured to the suspended structures and the suspended structures are connected to the holder, and the flexible frame is suspended above the substrate;
   an elastic component connected to the flexible frame, wherein a stiffness of the elastic component in a Z-axis direction is smaller than a stiffness of the flexible frame in the Z-axis direction and the Z-axis direction is parallel to a normal direction of the substrate;
   a first reflector connected to the elastic component; and
   at least one actuator located between the flexible frame and the substrate or located between the first reflector and the substrate,
   the suspended structures, the flexible frame, the elastic component and the first reflector are coplanar in the Z-axis direction and are higher than the substrate in the Z-axis direction before a bias voltage being applied to the actuator, wherein the suspended structures and the actuator are separate components, and a portion of the actuator is attached to the substrate.

2. The tunable optical device as claimed in claim 1, wherein the actuator comprises a first actuator and a second actuator, the first actuator and the second actuator are respectively located at two opposite sides of any one of the suspended structures.

3. The tunable optical device as claimed in claim 2, wherein the first actuator comprises at least one oppositely disposed electrode pair, and an upper electrode of the electrode pair is connected to the first reflector and a lower electrode of the electrode pair is disposed on the substrate.

4. The tunable optical device as claimed in claim 2, wherein the second actuator comprises at least one oppositely disposed electrode pair, and an upper electrode of the electrode pair is disposed on the flexible frame and a lower electrode of the electrode pair is disposed on the substrate.

5. The tunable optical device as claimed in claim 4, wherein the number of the electrode pair is two, the two electrode pairs are symmetrically disposed with respect to the horizontal direction and respectively located at two opposite sides of the first reflector.

6. The tunable optical device as claimed in claim 1, wherein the holder comprises an island structure, a stripe structure, or a structure surrounding the flexible frame.

7. The tunable optical device as claimed in claim 1, wherein the flexible frame comprises a body and two wing structures, wherein the two wing structures are respectively connected to two opposite sides of the body and the first reflector is disposed in the body, the two wing structures are parallel to the substrate and coplanar.

8. The tunable optical device as claimed in claim 7, wherein a part of the support unit is located between the body and any one of the wing structures.

9. The tunable optical device as claimed in claim 7, wherein the body surrounds the first reflector, and the elastic component is located between the body and the first reflector.

10. The tunable optical device as claimed in claim 1, further comprising:
    a second reflector disposed on the substrate, wherein the second reflector is opposite to the first reflector.

11. The tunable optical device as claimed in claim 1, wherein the support unit, the flexible frame, and the elastic component comprise a conductive material.

12. The tunable optical device as claimed in claim 11, wherein the first reflector is electrically connected to at least one external electrode pad through the elastic component, the flexible frame, and the support unit.

13. The tunable optical device as claimed in claim 1, wherein the actuator comprises a thermal actuator, a piezoelectric actuator, an electrostatic actuator, or an oppositely disposed electrode pair.

14. The tunable optical device as claimed in claim 13, wherein the actuator comprises at least one oppositely disposed electrode pair, wherein an upper electrode of the electrode pair is connected to the first reflector or disposed on the flexible frame, and a lower electrode of the electrode pair s disposed on the substrate.

15. The tunable optical device as claimed in claim 14, wherein the upper electrode connected to the first reflector or disposed on the flexible frame, the first reflector, the elastic component, the flexible frame, and the support unit are electrically connected to a first external electrode pad.

16. The tunable optical device as claimed in claim 14, wherein the lower electrode disposed on the substrate is electrically connected to a second external electrode pad or a third external electrode pad.

17. A tunable optical device, comprising:
    a substrate;
    at least one support unit, comprising:
        at least one holder fixed onto the substrate; and
        at least two suspended structures;
    a flexible frame, the suspended structures are symmetrically disposed with respect to a horizontal direction and respectively located at two opposite sides of the flexible frame, wherein the suspended structures are parallel to the substrate, wherein the flexible frame is secured to the suspended structures and the suspended structures are connected to the holder, and the flexible frame is suspended over the substrate, wherein the flexible frame comprises a body and two wing structures and the two wing structures are respectively connected to two opposite sides of the body, the two wing structures are parallel to the substrate and coplanar;
    an elastic component connected to the body of the flexible frame, wherein a stiffness of the elastic component in a Z-axis direction is smaller than a stiffness of the flexible frame in the Z-axis direction and the Z-axis direction is parallel to a normal direction of the substrate;
    a first reflector connected to the elastic component, wherein the body surrounds the first reflector and the elastic component is located between the body and the first reflector;
    a second reflector disposed on the substrate and being opposite to the first reflector;

a first actuator located between the first reflector and the substrate, wherein the first actuator comprises an oppositely disposed first electrode pair and an oppositely disposed second electrode pair, wherein a first upper electrode of the first electrode pair and a second upper electrode of the second electrode pair are respectively connected to the first reflector, and a first lower electrode of the first electrode pair and a second lower electrode of the second electrode pair are respectively disposed on the substrate;

a second actuator, wherein the second actuator and the first actuator are respectively located at two opposite sides of any one of the suspended structures, and the second actuator is located between each of the wing structures of the flexible frame and the substrate, wherein the second actuator comprises an oppositely disposed third electrode pair and an oppositely disposed fourth electrode pair, and a third upper electrode of the third electrode pair and a fourth upper electrode of the fourth electrode pair are respectively disposed on the two wing structures and a third lower electrode of the third electrode pair and a fourth lower electrode of the fourth electrode pair are respectively disposed on the substrate, the suspended structures, the flexible frame, the elastic component and the first reflector are coplanar in the Z-axis direction and are higher than the substrate in the Z-axis direction before a bias voltage being applied to the first actuator or the second actuator, wherein the suspended structures, the first actuator and the second actuator are separate components, and a portion of the first actuator and a portion of the second actuator are attached to the substrate;

a first external electrode pad disposed on the substrate, wherein the first upper electrode and the second upper electrode are electrically connected to the first external electrode pad respectively through the first reflector, the elastic component, the flexible frame, the suspended structures, and the holder, and the third upper electrode and the fourth upper electrode are electrically connected to the first external electrode pad respectively through the flexible frame, the suspended structures, and the holder;

a second external electrode pad disposed on the substrate, wherein the first lower electrode and the second lower electrode are electrically connected to the second external electrode pad respectively; and a third external electrode pad disposed on the substrate, wherein the third lower electrode and the fourth lower electrode are electrically connected to the third external electrode pad respectively.

* * * * *